Jan. 14, 1930.  R. H. PANGBORN  1,743,728
CONVEYER CHAIN
Filed Oct. 25, 1928  2 Sheets-Sheet 1
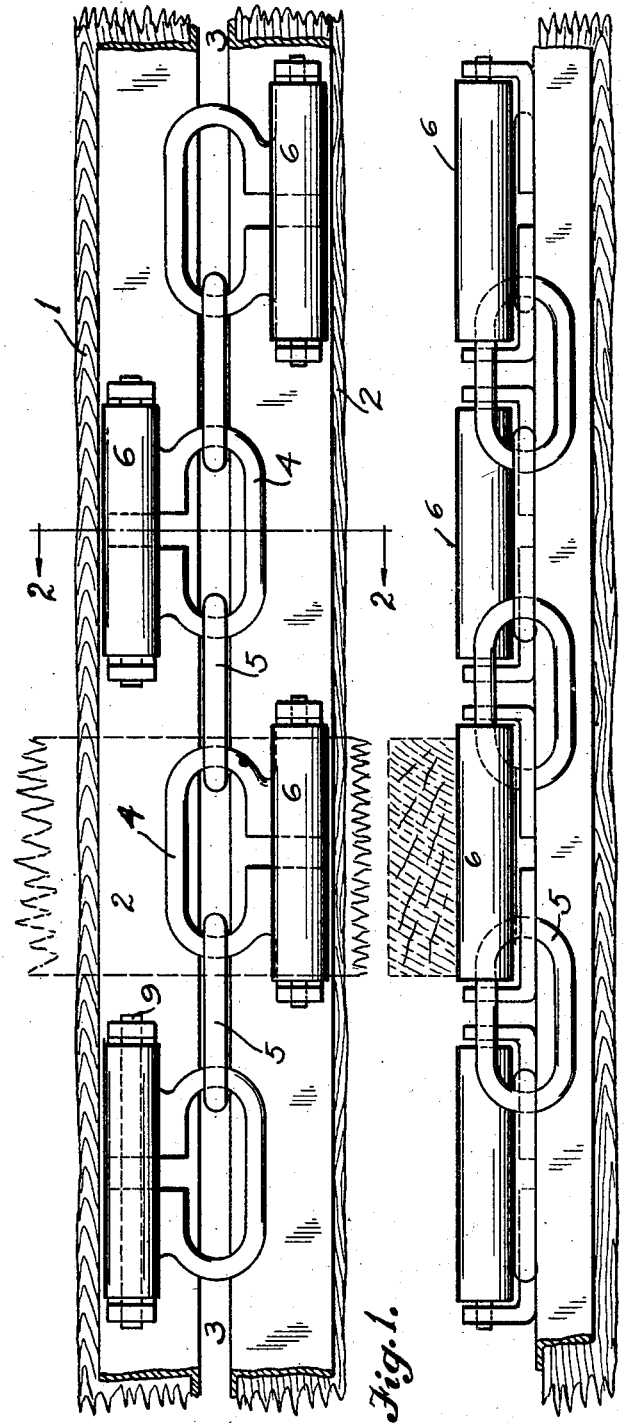
INVENTOR
R.H.Pangborn
BY
ATTORNEY Jan. 14, 1930.  R. H. PANGBORN  1,743,728
CONVEYER CHAIN
Filed Oct. 25, 1928   2 Sheets-Sheet 2
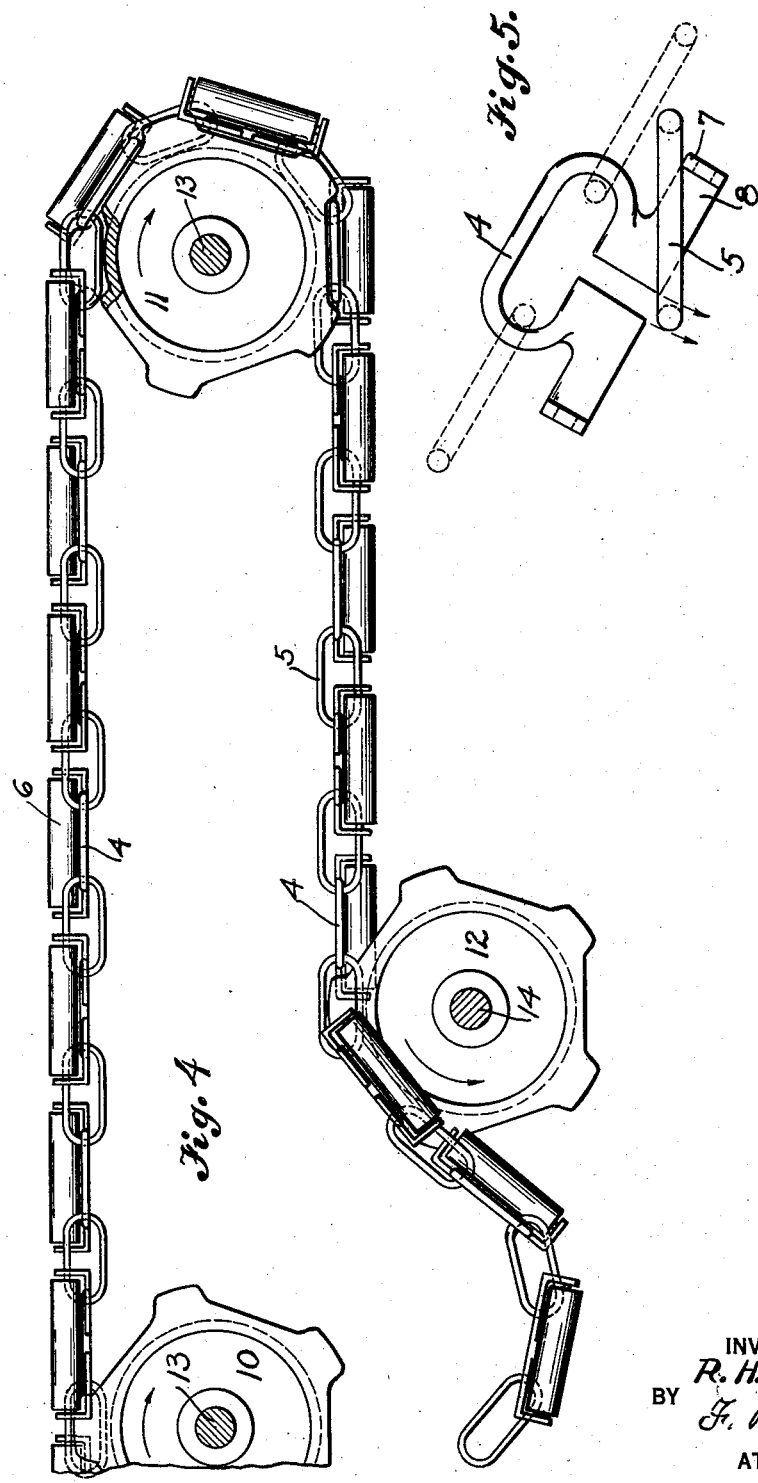
INVENTOR
R. H. Pangborn
BY
ATTORNEY Patented Jan. 14, 1930

1,743,728

UNITED STATES PATENT OFFICE

REDMOND H. PANGBORN, OF TACOMA, WASHINGTON, ASSIGNOR OF ONE-HALF TO HILL HUDSON, OF PIERCE COUNTY, WASHINGTON

CONVEYER CHAIN

Application filed October 25, 1928. Serial No. 315,039.

This invention relates to improvements in conveyer chains and has for its principal object to improve upon the construction shown, described and claimed in my co-pending case Serial Number 282,159, filed June 1, 1928. The principal point of improvement is that the chain in the present invention is so constructed that all of the valuable features shown in my said co-pending case are preserved and with the additional advantage that the chain is susceptible of what is commonly termed in the art "reverse drive." That is to say, it renders the chain of my present invention capable of being run over sprocket wheels spaced apart so that the chain may freely pass around the sprocket wheels in endless fashion, without interference with the rollers or other equivalents, as shown in my co-pending case. The term "reverse drive" is well understood by those skilled in the art to mean the running of the chain over sprocket wheels spaced apart, a third sprocket wheel in a plane below the other two sprocket wheels which rotates in a direction opposite to the other two sprocket wheels, thus maintaining the chain between the spaced sprocket wheels in a taut condition and the slack or idle part of the chain, occurring between the one of the spaced apart sprocket wheels from which the chain is traveling and the sprocket wheel which is in a lower plane. I accomplish these and other objects of my invention by the peculiar arrangement and combination of the parts as will be more fully hereinafter described and explained in the following specification, shown in the accompanying drawings and finally pointed out in the appended claims.

In the drawings:

Figure 1 is a plan view.

Figure 2 is a sectional view taken upon the line 2—2 of Figure 1.

Figure 3 is a side elevation.

Figure 4 is an elevational view of the chain as it passes over its sprocket wheels.

Figure 5 is a detailed view showing the manner of easy assembly of the links.

Referring now more particularly to the drawings, reference numerals 1 and 2 indicate timbers which are in spaced relation to each other, as shown, leaving a channel 3 between them. 4 indicates the horizontally disposed links of the chain and 5 the vertical links. The horizontally disposed links are divided on one side and that side extended to form extensions 8, the upturned ends 7 of which are bored through to receive pintles 9 of the rollers 6. The links 4 slide along upon the upper faces of the timbers 1 and 2, the vertically disposed links project downwardly into the channel 3 between the timbers. Sprocket wheels 10 and 11 are spaced apart as shown in Fig. 4, while 12 indicates a lower sprocket wheel. The sprocket wheels 10 and 11 revolve about the centers 13 in clockwise direction and the sprocket wheel 12 rotates about its center 14 in contra-clockwise direction. That portion of the chain between the upper left hand sprocket wheel 10, onward to the sprocket wheel 11 thence downwardly and to the sprocket wheel 12 is at all times kept taut as will be obvious, and whatever slack may occur takes place between the sprocket wheel 13 and the sprocket wheel 10. The vertically disposed links pass between the teeth of the sprocket wheels, the horizontally disposed links fitting into the spaces 15 of the said sprocket wheels so that the chain passes freely over the wheels. Referring now particularly to Fig. 5, to disassemble the links in case of necessary repairs, or for other purposes, the roller of one of the horizontal links 5 is removed, and one of the vertical links 4 is moved from its dotted position into its full lined position as plainly seen in Fig. 5. The space 16 being of sufficient width to admit the passage of one end of the link 5 through it. By continuing the rotation of the link 5 in the direction of the curved arrows in Fig. 5, the two links are quickly separated. To reassemble, the operation is reversed.

From the above it will be seen that the particular improvement of this invention is that the chain may be used in reverse drive as shown in Fig. 4, while the chains of my former invention do not permit this.

Claims:

1. A chain comprising a series of horizontally disposed links alternately spaced by a series of vertically disposed links, the said horizontally disposed links being broken at one side, the said side having extensions having upturned ends, and rollers carried by pintles journaled in holes in the said upturned ends.

2. A chain comprising a series of horizontally disposed links alternately spaced by a series of vertically disposed links, the said horizontally disposed links being broken at one side, the said side having extensions having upturned ends, and rollers carried by pintles journaled in holes on the said upturned ends, the said horizontal links when in chain formation being positioned to dispose the rollers alternately upon opposite sides of the vertical links.

In testimony whereof I affix my signature.

REDMOND H. PANGBORN.